W. A. COOK.
STAY BOLT TAP.
APPLICATION FILED MAR. 23, 1917.
1,235,114.
Patented July 31, 1917.
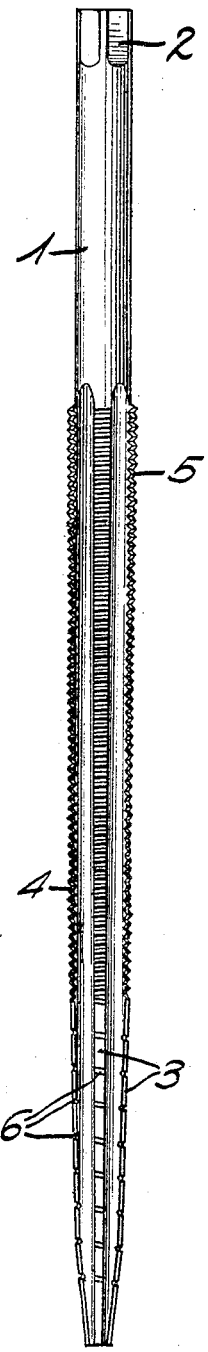
Inventor
Wallace A. Cook
By his Attorney
Wm Wallace Whit

UNITED STATES PATENT OFFICE.

WALLACE A. COOK, OF GREENFIELD, MASSACHUSETTS, ASSIGNOR TO GREENFIELD TAP AND DIE CORPORATION, OF GREENFIELD, MASSACHUSETTS.

STAY-BOLT TAP.

1,235,114.  Specification of Letters Patent.  Patented July 31, 1917.

Application filed March 23, 1917. Serial No. 156,844.

*To all whom it may concern:*

Be it known that I, WALLACE A. COOK, a citizen of the United States of America, residing at Greenfield, Franklin county, Massachusetts, have invented new and useful Improvements in Stay-Bolt Taps, of which the following is a specification.

My invention relates to staybolt taps, which comprise a shank having a tapered reamer portion, and a tap portion; and has for its object a novel construction by means of which the chips as cut by the reamer portion are broken up and ejected, thus rendering the operation of the reamer portion in enlarging the hole easier, prolonging the life of the reaming edges, and freeing the hole of the chips reamed out so as to facilitate the cutting of the thread by the tap portion of the staybolt tap.

My invention consists in the construction, combination, and arrangement of parts herein illustrated, described and claimed.

In the accompanying drawing I have illustrated a preferred form of my invention, in which the staybolt tap comprises a shank 1 provided with usual means such as the squared end 2 by which it may be turned. At the other end is provided a comparatively long reamer portion of but slight taper 3, and immediately adjacent the reamer portion there is formed upon the shank a tapered thread cutting portion 4 followed by a straight finishing thread-cutting portion 5.

Upon the reamer portion is formed means for breaking up the chips as cut, which in the form illustrated consists of notches formed in the cutting edges by a reverse spiral groove 6 extending for practically the full portion of the reamer, and cut with the direction of advance of the spiral in the opposite direction to that of the thread cutting teeth.

Owing to the slight taper and comparatively great length of the reamer, the chips cut thereby are very thin, and the tendency is for them to curl up in the grooves or fluted portions between the cutting edges of the reamer and clog its action, and also to interfere with the cutting action of the tap which follows the reamer into the hole. The reverse spiral groove 6 serves to break off these chips before they have acquired any considerable length, and they are carried along with the reamer and ejected from the forward end of the hole, thus enabling the cutting edges of the reamer and of the tap to act directly upon the surface of the hole without having to cut and break the chips.

Having now described my invention I claim as new and desire to secure by Letters Patent:

A staybolt tap comprising a shank having reaming cutting edges formed on its forward portion, thread cutting edges formed on the following portion, and a reverse spiral groove on the reamer portion for breaking chips.

In testimony whereof I have signed my name to this specification.

WALLACE A. COOK.

Copies of this patent may be obtained for five cents each, by addressing the "Commissioner of Patents, Washington, D. C."